United States Patent

Imbert et al.

Patent Number: 5,194,938
Date of Patent: Mar. 16, 1993

[54] SECAM DECODER WITH PHASE-LOCKED LOOP DEMODULATORS

[75] Inventors: Michel Imbert, Voiron; Gérard Bret, Echirolles, both of France

[73] Assignee: SGS-Thomson Microelectronics, S.A., Gentilly, France

[21] Appl. No.: 760,532

[22] Filed: Sep. 17, 1991

[30] Foreign Application Priority Data

Sep. 18, 1990 [FR] France ............................. 90 11826

[51] Int. Cl.⁵ ......................................... H04N 11/18
[52] U.S. Cl. ......................................... 358/14; 358/23
[58] Field of Search ............................. 358/14, 23, 24; 329/325, 326, 346, 360

[56] References Cited

U.S. PATENT DOCUMENTS

| | | | |
|---|---|---|---|
| 4,117,410 | 9/1978 | Bender | 329/326 |
| 4,249,201 | 2/1981 | Christiansen et al. | 358/24 |
| 4,553,156 | 11/1985 | Douziech | 358/14 |
| 4,631,487 | 12/1986 | Beech | 329/360 |
| 4,933,749 | 6/1990 | Van Lammeren | 358/23 |

FOREIGN PATENT DOCUMENTS

3243014A1 5/1984 Fed. Rep. of Germany.
0222653A1 5/1987 France.

Primary Examiner—James J. Groody
Assistant Examiner—Sherrie Hsia
Attorney, Agent, or Firm—Lowe, Price, LeBlanc & Becker

[57] ABSTRACT

A SECAM decoder comprises an input receiving a chrominance subcarrier (SP); first and second outputs delivering respectively the decoded blue (B2) and red (R2) signals; a first PLL phase demodulator (30) receiving the subcarrier (SP), operative only during the blue lines; a second PLL phase demodulator (31) receiving the subcarrier, operative only during the red lines; a first adder (32) receiving the output signal (B1) of the first demodulator (30) and this same signal delayed by a line period to deliver the decoded blue signal (B2); an adder (33) receiving the output signal (R1) of the second demodulator (31) and this same signal delayed by a line period to deliver the red decoded signal (R2).

8 Claims, 3 Drawing Sheets

SECAM DECODER WITH PHASE-LOCKED LOOP DEMODULATORS

BACKGROUND OF THE INVENTION

The present ivention relates to color television circuits and, more particularly, to a SECAM decoder circuit.

In the SECAM system, the chrominance informations are provided by modulation of a chrominance subcarrier. Two successive lines respectively contain R-Y informations representative of red and B-Y informations representative of blue. These informations are contained in the frequency modulation of the subcarrier, which is distinct for two successive lines (4.406 MHz for red and 4.250 MHz for blue). It will be said that the signal contains a succession of red and blue modulated lines. Of course, the terms "red line" and "blue line" are used here as a simplification and one can refer to conventional literature about the SECAM system to more accurately define the content of the chrominance informations carried by successive lines.

In a television set, it will thus be necessary to separate the blue and red lines on two channels each comprising respectively only blue lines and only red lines, and to demodulate these lines. According to the above, on each channel respectively, a succession of blue demodulated lines and one line long blanks (generally 64 microseconds long), and a succession of demodulated red lines and one line long blanks, are obtained. Each of these blanks is subsequently filled by the previous blue or red line by delaying it by a line period. Thus, two channels respectively providing a blue line—delayed blue line succession and a red line—delayed red line succession are obtained. The interval remaining between the lines, the line retrace, is set at a reference level (generally zero) representing black. This set of operations constitutes the SECAM decoding.

FIG. 1 represents a first SECAM decoder of the prior art. A two channel permutating circuit 10 receives on a direct channel the chrominance subcarrier SP and on a delayed channel the subcarrier SP delayed by a delayed line 11 of a line period $T_H$. The permutating circuit is activated by a square signal of half the line frequency $F_H/2$, which switches it at each line. On a first output channel BO a delayed line—direct line succession, which is no other than, for example, the blue line—delayed blue line succession, is obtained and on a second output channel RO, a direct line—delayed line succession, which is no other than, for example, the red line—delayed red line succession, is obtained. Afterwards, channel BO, respectively RO, passes through a conventional demodulator 12, respectively 13, of which the central demodulation frequency $F_{OB}$ of blue respectively $F_{OR}$ of red, is established by an adjustable LC circuit. After demodulation, signal BO, respectively RO, is fed to a blanking circuit 14, respectively 15, controlled by a blanking signal BLK which assumes an active level during the line retrace periods to re-establish the black level.

The blanking circuits, generally constituted by an analog switch setting the output signal at zero, are essential, especially after a demodulator, because the black level between the lines is generally subject to an involuntary DC offset after processing of the lines. The permutating circuit, the demodulators and the blanking circuits of such a decoder are in general integrated in bipolar technology in the same integrated circuit. Around this integrated circuit, it is thus necessary to provide a delay-line and two LC circuits, which cannot be integrated. The delay-line, placed before demodulation, must be a high frequency delay-line because it must allow the high modulation frequencies to pass. It is generally constituted by a quartz crystal. The permutating and the blanking circuits are complex because it is difficult to realize analog switches in bipolar technology.

FIG. 2 reproduces the FIG. 1 of the European Patent Application 0 009 204 which describes a chrominance decoder essentially intended for the PAL standard. The subcarrier SP is provided to two demodulators 21 and 22 of which the respective outputs B1 and R1 are each connected directly to an input and through a delay-line 23, 24 to another input of an adder 25, 26. The outputs of these adders form the decoded outputs B2 and R2. The demodulators, the delay-lines and the adders are Charge-Coupled-Devices (CCD). The CCD elements 21, 23 and 25 of the blue channel as well as the CCD elements 24 and 26 of the red channel are controlled by the PAL reference frequency FB divided by 2 through a divider 27. The CCD demodulator 22 is controlled by a frequency FR divided by 2 through a divider 28. The phase of signal FR with respect to that of signal FB is switched between + and −90° at each line.

With this configuration, at the output of demodulator 21, a signal B1 approximately null during the red lines and comprising the demodulated blue informations during the blue lines is obtained. In the same way, at the output of demodulator 22, a signal R1 approximately null during the blue lines and comprising the demodulated red informations during the red lines is obtained. The adders and the delay-lines enable the filling of the blanks at the outputs of the demodulators by the demodulated informations of the previous line.

A drawback of this circuit is that the output of the demodulators is not exactly null when they receive a line that does not correspond to them. Thus, at the output of the adders, the delayed lines are combined with non null informations which constitute noise that can deteriorate the image. Moreover, blanking circuits must be provided at the output of the adders, as it is done in FIG. 1, in order to re-establish the black level between the line retrace periods.

The application 0 009 204 provides the use of this circuit as a SECAM decoder, but the modifications to bring, namely the additional components to provide, are so numerous that the decoder becomes uselessly complex.

An object of the present invention is to provide a SECAM decoder of a similar architecture as that of FIG. 2 needing only external signals that exist in a television set.

Another object of the present invention is to provide a SECAM decoder needing no external components, namely blanking circuits, nor adjustments.

SUMMARY OF THE INVENTION

To achieve these objects as well as others, the present invention provides a SECAM decoder comprising two demodulators receiving a chrominance subcarrier carrying informations corresponding alternately to a blue line and a red line, the outputs of which are each connected directly to an input and through a delay-line to another input of an adder. Each demodulator is a Phase-Locked-Loop demodulator comprising a phase comparator receiving at an input the subcarrier, delivering a control current to a current controlled oscillator and receiving at another input the output signal of the oscillator; resistive means placed in the control current path, across which a voltage representative of the demodulated subcarrier is tapped; and a switch connected in parallel to the resistive means, this switch being opened only during lines of a same color.

According to an embodiment of the invention, the switch is controlled by a blanking signal which is at an active level during the line retrace periods and the lines corresponding to the other color.

According to an embodiment of the invention, as a function of a periodic inhibition signal, the output current of the comparator is cancelled and an adjustment current is provided to the oscillator.

According to an embodiment of the invention, the switch is comprised of at least one MOS transistor.

According to an embodiment of the invention, the decoder comprises means to provide, when the inhibition signal is at a predetermined level, the adjustment current having a first constant value corresponding to an idle adjustment of the oscillator, and to provide, when the inhibition signal assumes the complementary of the predetermined logic state, the adjustment current having a second value which is a function of the phase difference between the output signal of the oscillator and a reference frequency.

According to an embodiment of the invention, said means comprise a second phase comparator providing a voltage which is a function of the phase difference between the output signal of the oscillator and the reference frequency, and receiving the inhibition signal of which the complementary state cancels the voltage; a voltage-to-current converter converting the voltage in a second control current of the oscillator; means for storing the second control current; and a current source providing a constant current which controls the oscillator when the inhibition signal is at the predetermined state.

According to an embodiment of the invention, the means for storing the second control current comprise a capacity connected between the output of the second comparator and ground; and a voltage-to-current converter connected between the output of the second comparator and the control input of the oscillator.

According to an embodiment of the invention, the inhibition signal assumes the complementary state during the frame retrace periods.

BRIEF DESCRIPTION OF THE DRAWINGS

The foregoing and other objects, features and advantages of the present invention will be described in detail in the following description of particular embodiments by referring to the attached drawings in which.

DESCRIPTION OF THE PREFERRED EMBODIMENTS

Figure 3:
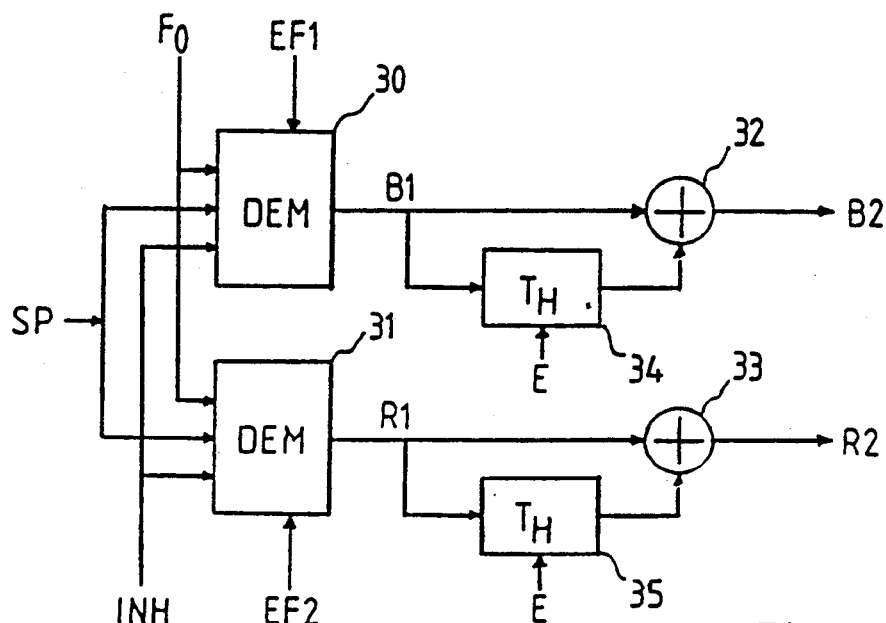
FIG. 3 represents a simplified SECAM decoder configuration according to the present invention.
Figure 5:
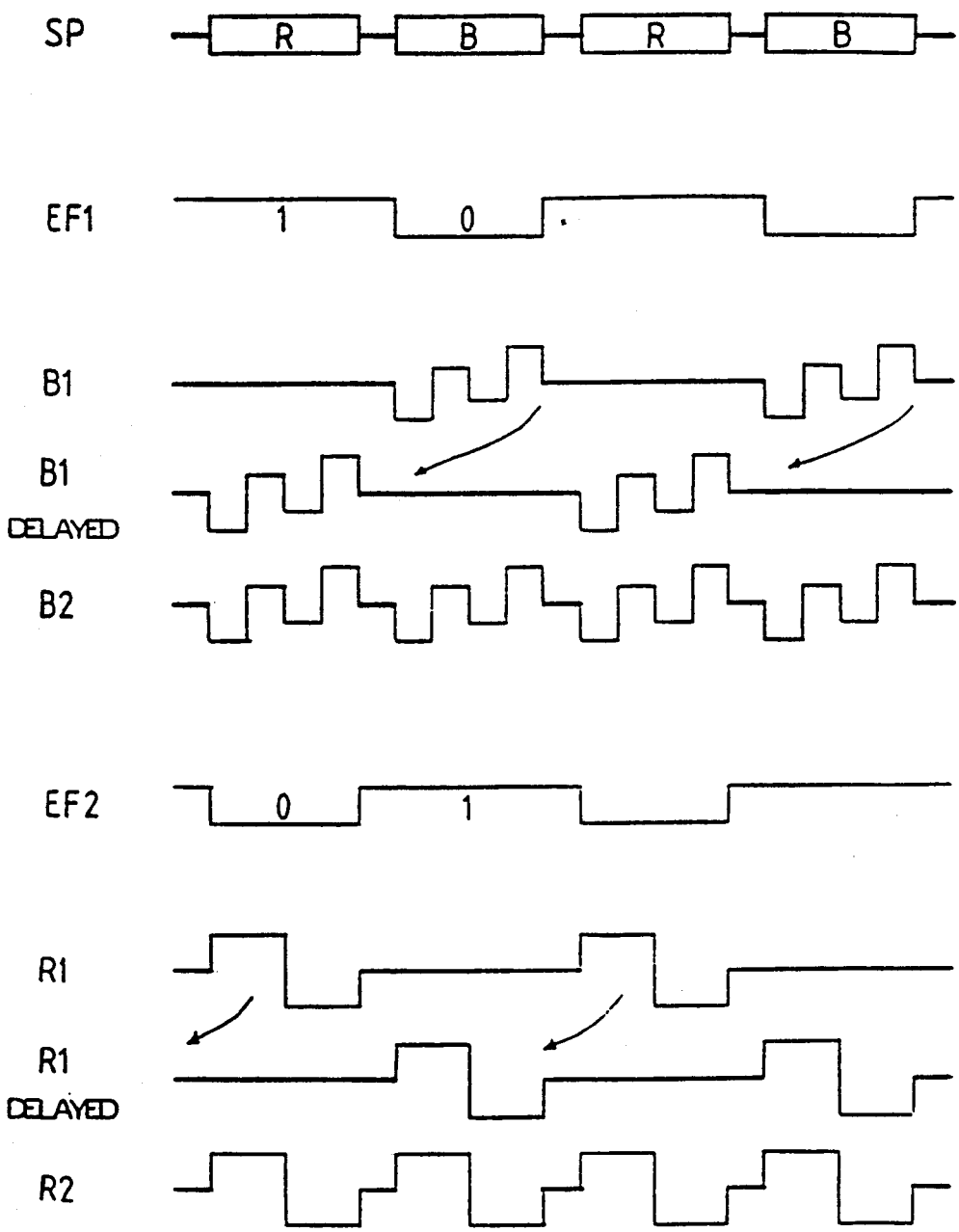
FIG. 5 represents various wave-forms obtained at different nodes of the decoders of the prior art and of the invention.

FIG. 3 represents a SECAM decoder configuration according to the invention which will be better understood by also referring to the wave-forms of FIG. 5. The decoder comprises two Phase-Locked-Loop (PLL) demodulators 30 and 31 each receiving the chrominance subcarrier SP, a reference frequency $F_0$ available in the television set (for example the PAL reference frequency of 4.43 MHz in a multistandard decoder), an inhibition signal INH and respectively blanking signals EF1 and EF2, and providing respectively the signals B1 and R1. Demodulator 30 for example demodulates the blue lines of the subcarrier SP and, responding to signal EF1, the output signal B1 is cancelled during the periods between two blue lines in order to re-establish the black level during these periods. Demodulator 31 operates in the same way to demodulate the red lines, re-establish the black level and suppress the blue lines responding to signal EF2.

Figure 1:
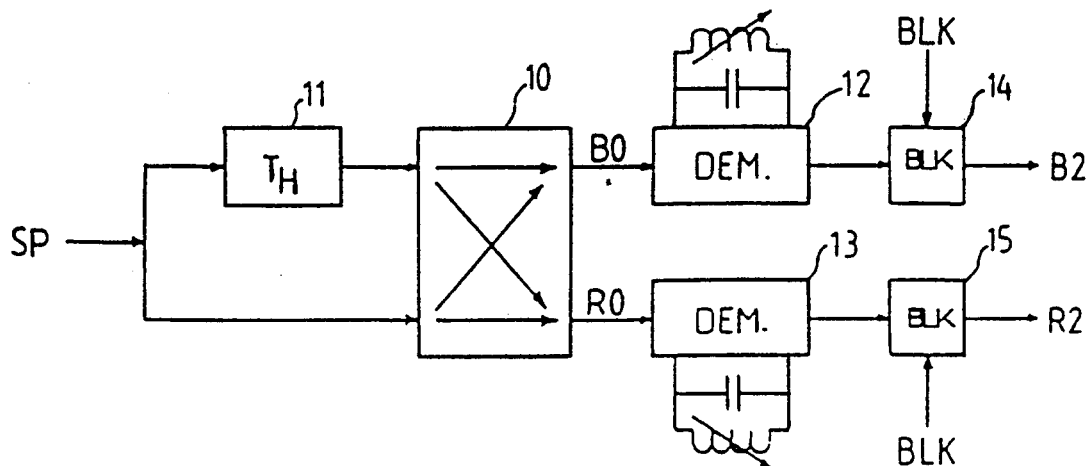
FIGS. 1 and 2 intended to illustrate the prior art have been previously described.
Figure 2:
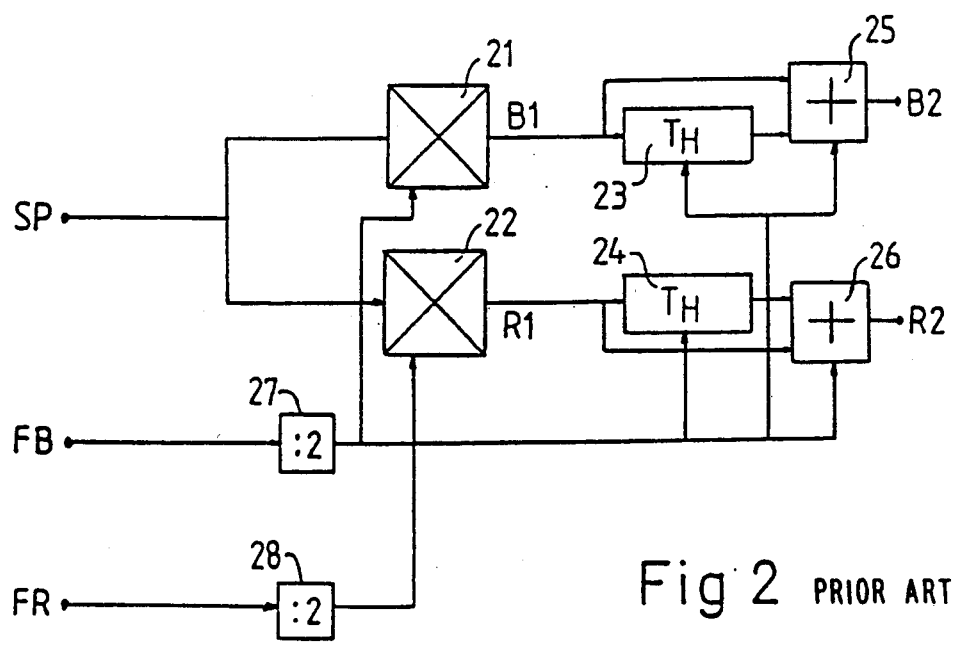

The signals B1 and R1 available at the output of demodulators 30 and 31 correspond to those of FIG. 2 and are processed in the same way by a circuit comprising two adders 32 and 33 and two delay-lines 34 and 35. These delay-lines are, for example, Charged-Coupled-Devices entirely integratable in bipolar-CMOS (BIC-MOS) technology in a decoder integrated circuit according to the invention; in this case, the delay-lines are provided with sampling pulses E. The demodulators 30 and 31 are periodically inhibited, for example during the frame retrace periods, responding to the signal INH, in order to operate a re-adjustment of the idle frequency of the demodulators to the frequency $F_0$.

Figure 4:
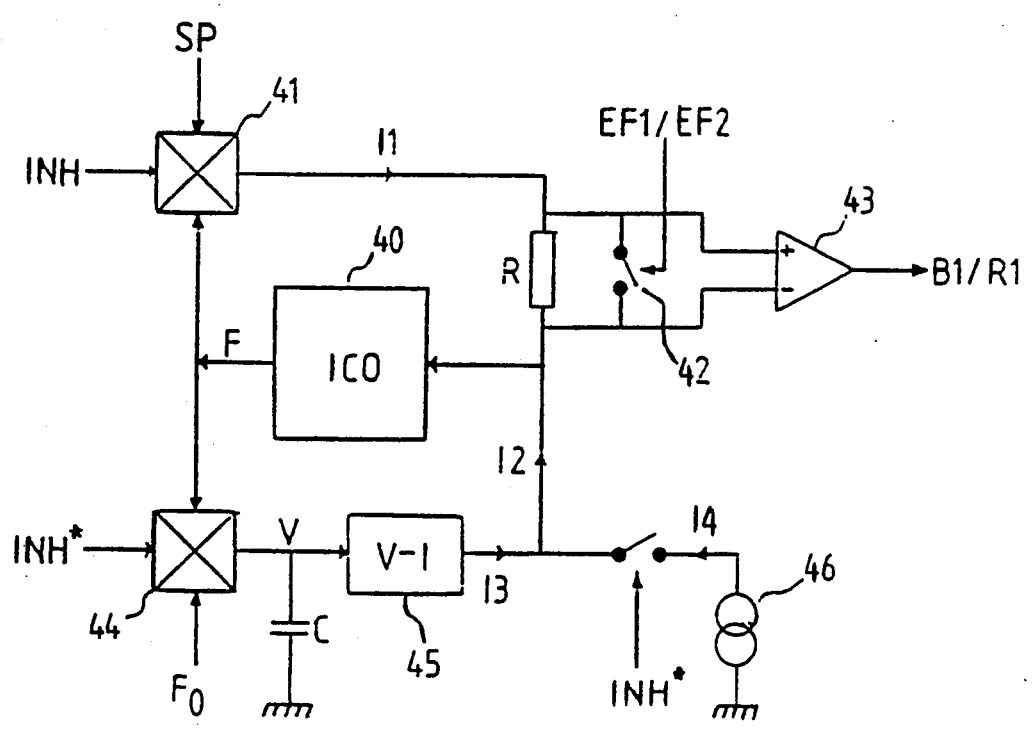
FIG. 4 represents a schematic diagram of a Phase-Locked-Loop demodulator of the decoder of the invention.

FIG. 4 represents in more detail PLL demodulator used in the decoder of the invention. A current controlled oscillator 40 (ICO) is servo-controlled by two PLL loops. The first loop forms the phase demodulator and the second serves to establish and to periodically readjust the idle frequency of the oscillator.

The first loop comprises a phase comparator 41 which can be inhibited by signal INH, receiving the subcarrier SP and the output signal F of the oscillator 40, and delivering a current I1 to the control input of the oscillator through a resistor R. A switch controlled by the signal EF1 (or EF2) is connected across the resistor R and a differential amplifier 43 amplifies the voltage across the resistor and outputs the signals B1 (or R1). Preferably, switch 42 is comprised of MOS transistors.

The second loop comprises a second phase comparator 44 which can be inhibited by the complementary INH* of signal INH, receiving a reference frequency $F_0$ and signal F, and delivering a voltage V which is stored in a capacity C, to a voltage-to-current converter 45 which provides a current I3 proportional to V to the control input of the oscillator 40. A current source 46 providing a constant current I4 is connected to the control input of the oscillator as a function of signal INH*.

In a readjustment phase during a frame retrace, signal INH is "high", which inhibits comparator 41 and cancels current I1, and disconnects the source 46. The second PLL is operative and the frequency F of oscillator 40 is adjusted to $F_0$ as a function of current I3.

In a demodulation phase outside the frame retrace periods, signal INH goes "low", comparator 44 is inhibited, its output is set to high impedance and the voltage V which was present at the output is stored in capacity C. Thus, current I3 remains substantially constant until the next readjustment phase. To this current I3 which fixes the idle frequency of oscillator 40 to $F_0$, is added the current I4 provided by current source 46 activated by the signal INH* going "high".

Current I4 is different in each demodulator and it is such that, when it is added to I3 supposing that I1 is null, it fixes the idle frequency of the oscillator to practically the modulation frequency ($F_{0B}$ or $F_{0R}$) of the concerned color, which is near to $F_0$. The values of I4 can be obtained at manufacture because they do not need to be accurate as they are only correction currents (in the above example, $F_0=4.43$ MHz, $F_{0B}=4.25$ MHz and $F_{0R}=4.406$ MHz).

During this demodulation phase, the first phase comparator 41 is activated and its output current I1 is added to the currents I3 and I4 at the control input of the oscillator so that the frequency of the latter is adjusted to the frequency of the subcarrier SP. Current I1 then reflects the phase variations, which in fact represent the frequency differences, between the subcarrier SP and F. Current I1 is converted to a voltage by passing through resistor R. This voltage is amplified by the differential amplifier 43 which outputs the signal B1 (or R1).

As a function of the blanking signal EF1 (or EF2), resistor R is short circuited by a switch 42, which cancels the output signal B1 (or R1) re-establishing the black level.

The blanking signal EF1 can be obtained from the above mentioned conventional signals $F_H/2$ and BLK, and signal EF2 can be obtained from the complementary of signal $F_H/2$, and the signal BLK.

All the above described elements can be integrated in a same integrated circuit in BICMOS technology, and in particular, the CCD delay-lines and all the necessary switches being in CMOS technology which enables a very simple configuration of the latter. Currents I4 of each demodulator are obtained at manufacture, which suppresses the two tedious frequency adjustments necessary when using conventional integrated circuits.

We claim:

1. A SECAM decoder comprising two demodulators receiving a chrominance subcarrier carrying lines of information corresponding alternately to a blue color line and a red color line, the outputs of which are each connected directly to an input and through a delay-line to another input of adder, each demodulator being a Phase-Locked-Loop demodulator comprising:
    a phase comparator receiving at an input the subcarrier, delivering a control current to a current controlled oscillator and receiving at another input the output signal of the oscillator;
    a resistive means placed in the control current path, across which a voltage representative of the demodulated subcarrier is tapped; and
    a switch connected in parallel to the resistive means, this switch being opened only during lines of a first color.

2. A SECAM decoder as claimed in claim 1, wherein the switch is controlled by a blanking signal which is at an active level during the line retrace periods and the lines corresponding to a second color.

3. A SECAM decoder as claimed in claim 1, wherein as a function of a periodic inhibition signal, the output current of the comparator is cancelled and an adjustment current is provided to the oscillator.

4. A SECAM decoder as claimed in claim 1, wherein the switch is comprised of at least one MOS transistor.

5. A SECAM decoder as claimed in claim 3, comprising means for:
    providing, when the inhibition signal is at a predetermined logic level, the adjustment current having a first constant value corresponding to an idle adjustment of the oscillator, and
    providing, when the inhibition signal assumes the complement of the predetermined logic level, the adjustment current having a second value which is a function of the phase difference between the output signal of the oscillator and a reference frequency.

6. A SECAM decoder as claimed in claim 5, wherein said means comprise:
    a second phase comparator providing a voltage which is a function of the phase difference between the output signal of the oscillator and the reference frequency, and receiving the inhibition signal of which the complementary state cancels the voltage
    a voltage-to-current converter converting the voltage (V) in a second control current of the oscillator
    means for storing the second control current and
    a current source providing a constant current which controls the oscillator when the inhibition signal is at the predetermined logic level.

7. A SECAM decoder as claimed in claim 6, wherein the means for storing the second control circuit comprise:
    a capacity connected between the output of the second comparator and ground.

8. A SECAM decoder as claimed in claim 5, wherein the inhibition signal assumes the complement of the predetermined logic level during the frame retrace periods.

* * * * *